(12) United States Patent  (10) Patent No.: US 8,990,817 B1
Garai et al.  (45) Date of Patent: Mar. 24, 2015

(54) PREDICTING OUTCOME OF OPERATIONS OF MULTI-TIER APPLICATIONS

(75) Inventors: Debasish Garai, Maharashtra (IN); Sumeet S. Kembhavi, Maharashtra (IN)

(73) Assignee: Symantec Corporation, Moutain View, CA (US)

( * ) Notice: Subject to any disclaimer, the term of this patent is extended or adjusted under 35 U.S.C. 154(b) by 239 days.

(21) Appl. No.: 13/605,277

(22) Filed: Sep. 6, 2012

(51) Int. Cl.
*G06F 9/44* (2006.01)
*G06F 11/00* (2006.01)
*G06F 9/00* (2006.01)
*G06F 15/18* (2006.01)

(52) U.S. Cl.
CPC ........................... *G06F 15/18* (2013.01)
USPC ............ 718/100; 714/100; 714/1; 712/E9.05; 706/21

(58) Field of Classification Search
None
See application file for complete search history.

(56) References Cited

U.S. PATENT DOCUMENTS 7,454,660 B1 * 11/2008 Kolb et al. .................. 714/38.14
2002/0178349 A1 * 11/2002 Shibayama et al. .......... 712/235

* cited by examiner

*Primary Examiner* — Qing Wu
(74) *Attorney, Agent, or Firm* — Campbell Stephenson LLP

(57) ABSTRACT

Various systems and methods for automated error recovery in workflows. For example, one method involves receiving an operation indication. The operation indication indicates an operation that is to be performed using a multi-tier application system that includes first and second applications. The first and second applications are implemented using different tiers of the multi-tier application system. The method involves accessing dependency information that indicates first data dependencies between the first and the second applications. The method further involves determining outcome of execution of the operation, where the determining is based on the dependency information but does not include executing the operation.

17 Claims, 9 Drawing Sheets

PREDICTING OUTCOME OF OPERATIONS OF MULTI-TIER APPLICATIONS

BACKGROUND OF THE INVENTION

1. Field of the Invention

This application relates to managing execution of multi-tier applications. Particularly, this application relates to predicting outcome of various operations on such applications based on their dependencies on other applications.

2. Description of the Related Art

A distributed computing system can include multiple systems that can each include one or more applications. Each such application can be a part of a multi-tier (n-tier) application, such as an enterprise application. For example, a three-tier application can include presentation, processing, and data management tiers. Each such tier can be a logically and/or physically separate process. The n-tier application architecture allows software developers to create flexible and reusable applications. For example, by using such an n-tier architecture, developers can modify or add application for one tier at a time, rather than need to rewrite or upgrade the entire application (i.e., an entire application corresponding to the n-tier application). In one example, a three-tier application can include a presentation tier, a processing tier, and a data tier.

For the three-tier application example, the presentation tier can be the topmost level of the multi-tier application. For example, for an enterprise application for on-line shopping, an application in the presentation tier can display information related to such services as browsing merchandise, purchasing, and shopping cart contents. This presentation application can communicate with applications in other tiers by various methods. Continuing with this example, the function tier can perform various processing on data, such as on data that is accessed from a database tier application(s). This processed data can be passed to the presentation application. The third tier in this example can be a database tier. The database tier can include applications that access (e.g., store and retrieve) data from various database(s).

These applications implementing the enterprise application can have dependencies between each other. For example, the presentation application can depend on (e.g., use data that is generated and/or provided by) the function application(s). The function application(s) can be dependent on data provided by the database applications. Therefore, when the presentation application is executing, the function application(s) should also be executing in order to provide data to the presentation application. Similarly, when the function application(s) is executing, the database application(s) should also be executing to provide data to the function application(s).

BRIEF DESCRIPTION OF THE DRAWINGS

The embodiments of the present application may be better understood, and its numerous objects, features, and advantages made apparent to those skilled in the art by referencing the accompanying drawings.

Figure 1:
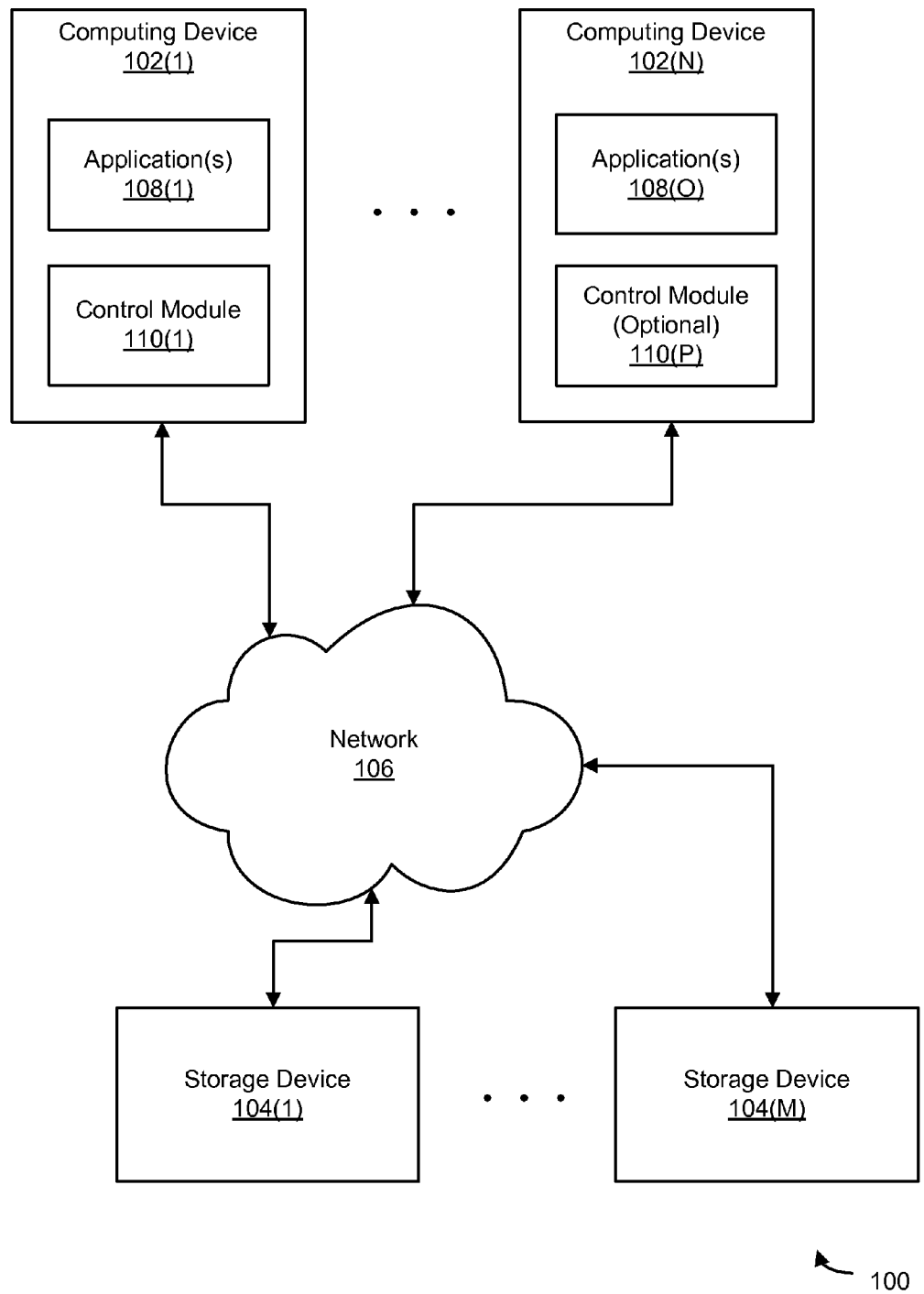
FIG. 1 is a block diagram illustrating a system that implements determining outcome of a potential application, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

FIG. 1 is a block diagram 100 of a system that implements operation prediction, according to some embodiments. As shown, the system, such a distributed storage system, includes computing devices 102(1)-102(N), which are coupled to various storage resources 104(1)-104(M) using one or more networks 106. Network 106 can include a WAN (Wide Area Network), such as the Internet, one or more LANs (Local Area Networks), and/or one or more SANs (Storage Area Networks). Computing devices 102(1)-102(N) can access data using storage resources 104(1)-104(N) (collectively also referred to as storage resources 104). Computing devices can execute various applications 108(1)-108(0).

Embodiments described herein are directed to predicting outcome of executing operations(s) that are performed on applications (e.g., applications 108(1)-108(0)). This prediction can be based on dependencies of each application on other application(s). These applications can be a part of application services that are implemented using the n-tier architecture. The application service can be a distributed application, and can include a presentation application, a function application, and a database application. Execution of such application service can include execution of at least one of each of a presentation application, a function application, and the database application. In the multi-tier application architecture, the presentation application may depend on data provided by one or more function applications. Furthermore, each function application may depend on data provided by one or more database applications. Each such application may also use various local dependencies (e.g., memory, processing bandwidth, etc).

Outcomes of certain operations, such as topping or starting of application services, can be predicted based on these data dependencies, as well as based on local dependencies. These outcomes can be predicted without executing these operations. For example, outcome of a command to start a certain application service can be predicted based on the data and local dependencies of applications of that application service. Similarly, outcome of a command to stop a certain application service can be predicted based on the data and local dependencies of applications (that are already executing) of that application service. Prediction of operations for commands other than starting and stopping execution of applications in the multiple-tier application model may be similarly predicted.

Computing devices 102(1)-102(N) (collectively also referred to as computing devices 102) are examples of devices such as workstations, personal computers, servers, PDAs (Personal Digital Assistants), cell phones, network switches, storage array controllers, and the like. Computing devices 102(1) and 102(2) can be used to implement multi-tier applications. Multi-tier applications can be implemented using an n-tier architecture, such as described below with reference to FIG. 2. Storage devices 104(1)-104(N) represent various physical and logical storage resources available to consumers within the system. These storage devices can include storage resources that are co-located with (also referred to as local to) consumers (e.g., such storage resources can be part of and/or directly coupled to the consumer's computing device) and/or storage resources that are located remotely from the consumers (e.g., such storage resources can be part of a data center, accessible to the consumers via a Wide Area Network (WAN) such as the Internet). Examples of storage devices can include disk drives, Compact Disc (CD) drives, Digital Versatile Disc (DVD) drives, tape drives, hard drives, and/or the like, and can be arranged using any number of technologies, such as using storage arrays (e.g., a Redundant Array of Independent Disks (RAID). Furthermore, storage devices 104 can be accessed using logical objects, such as subdisks, plexes, and/or volumes, among others.

In some embodiments, each computing device 102(1)-102(N) can implement one or more applications 108(1)-108(0) (also referred to collectively as applications 108) and one or more control modules 110(1)-110(P) (also referred to collectively as control modules 110). Applications 108 can implement the multi-tier applications. For example, computing devices 102 can implement a multi-tier application, also referred to as an application service. An application service can be implemented, for example, using applications from three different tiers, such as a presentation application, a function application, and a data application. In one embodiment, each application of the application service can be implemented using a separate computing device. However, additional or fewer computing devices can be used, as desired. For example, in some implementations, multiple computing devices can implement each application (e.g., a data application that is distributed across multiple devices). In some implementations, a single computing device can implement one or more such applications (e.g., a presentation application and a function application can be both implemented using a single computing device).

The data application can access and/or store data, such as can be stored using storage devices 104. The function application can process and/or analyze this data. The presentation application can present this processed/analyzed data, such as using a graphical user interface (GUI) to user(s). Thus, an application service can include at least three applications (i.e., a data application, a function application, and a data application) that have data dependencies on each other. The distributed storage system of FIG. 1 can implement multiple application services, some of which can share one or more applications. For example, there can be two separate application services that share the same data application.

Control module 110 can control the initiation, execution, and other functions of the application services. Control module 110 can be distributed across one or more computing devices 102. In one embodiment, control module 110 can be implemented using another computing device (i.e., one that does not also implement applications 108), as desired. In some embodiments, control module 110 can predict an outcome of an operation that is to be performed on an application service. Control module 110 can make this prediction without executing this operation. For example, control module 110 can predict whether a certain application service, that is already executing, can be stopped. Control module 110 can predict whether a certain application service, that has not yet been started, can be started. This predicted outcome can be used, e.g., by control module 110 and/or another element of the distributed storage system, such as to perform the respective operation and/or perform corrective action(s).

In some embodiments, control module 110 can also predict application(s) that would be affected by fault(s). For example, control module 110 can predict which applications (and/or application services) would be affected by fault of a single application, such as a data application, a fault of a group of applications (either in the same tier or as a part of different tiers), and/or a fault of an entire application tier. This predicted outcome can be used, e.g., by control module 110 and/or another element of the distributed storage system, such as to perform corrective action(s).

Figure 2:
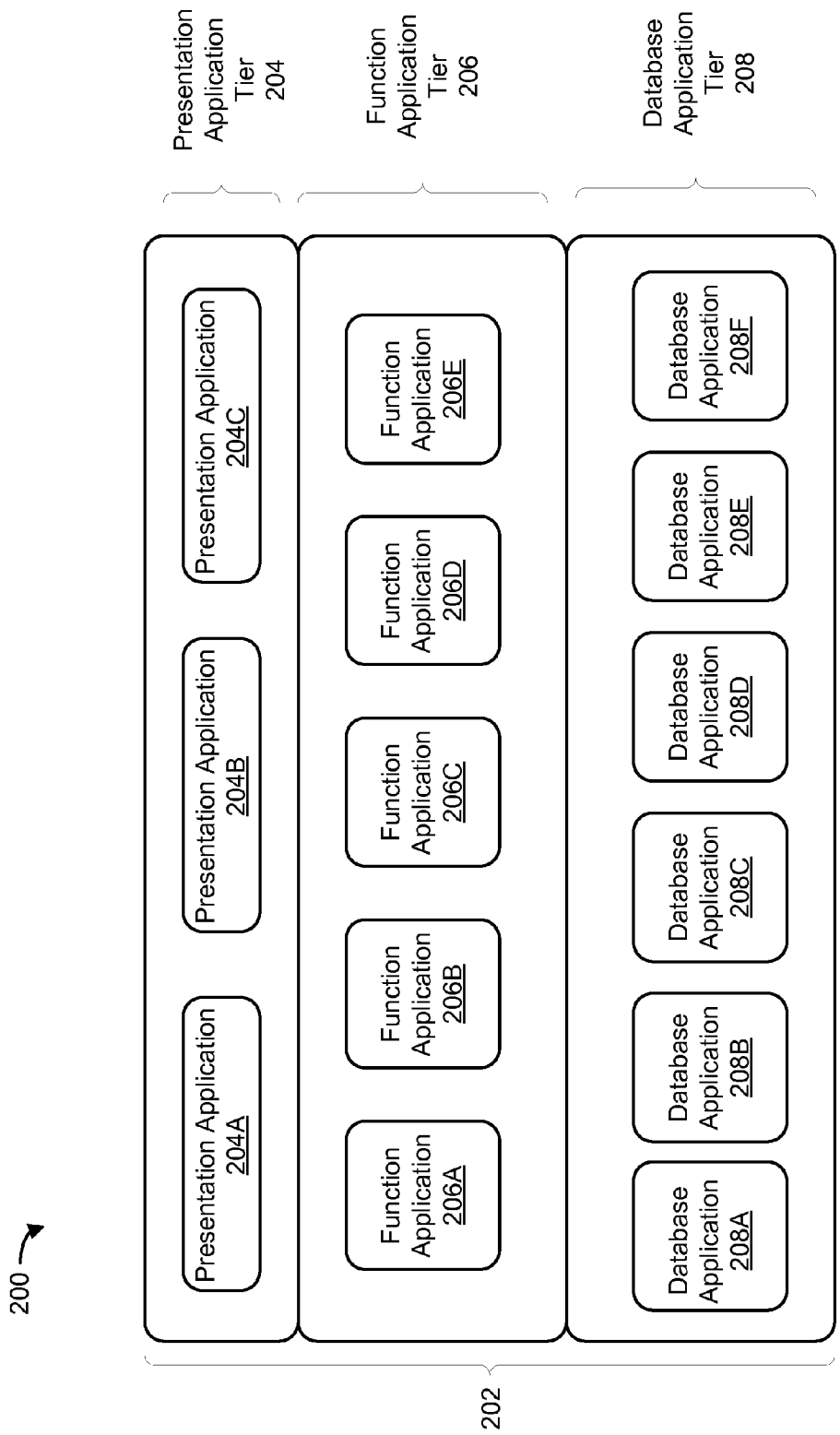
FIG. 2 is a block diagram illustrating multi-tier applications that includes a presentation application tier, a function application tier, and a database application tier, according to one embodiment.

FIG. 2 is a block diagram 200 illustrating multi-tier applications 202, according to some embodiments. Multi-tier applications 202 include applications from a presentation application tier 204, a function application tier 206, and a database application tier 208. Presentation application tier 204 includes presentation applications 204A-204C. Function application tier 206 includes function applications 206A-206E. Database application tier 208 includes database applications 208A-208F. It is noted that although FIG. 2 shows multi-tier applications 202 that include applications using three-tier architecture, multi-tier applications 202 can include applications from additional or fewer tiers, as desired.

Presentation applications 204A-204C can present a graphical user interface (GUI) to a user, and can be implemented as web-based applications. For example, a web application can include a web server software application. This web server application can communicate with another computer to present a GUI in a web browser on that computer. Function applications 206A-206E can include applications that process data and provide this data for use by presentation application 204A-204C. Database applications 208A-208F can include applications that access database(s) and provide such data for use by function applications 206A-206E. Each multitier application (i.e., each application service) can include at least one application from each tier, i.e., application(s) from presentation application tier 204, application(s) from function application tier 206, and application(s) from database application tier 108.

In one embodiment, the applications used by each application service can dynamically change. A control module (e.g., control module 110) can access dependency information that identifies various data dependencies, as well as local dependencies, of various applications of application services. For example, dependency information for presentation application 204A can indicate that presentation application 204A depends on function applications 206A and 206B for data. This dependency information associated with presentation application 204A can also indicate that these function applications 206A and 206B depend on database applications 208A-208C for data. In some implementations, communication among control module(s) and/or applications, such as by using notifications, can be implemented using the system described by application Ser. No. 13/279,864, filed on Oct. 24, 2011, which is incorporated herein in its entirety.

Control module 110 can thus predict whether a certain application service, that has not yet been started, can be started. In one embodiment, upon receiving of a command, such as a command for operation to initiate execution, the control module can determine dependencies used by each application of that application service. These dependencies include data dependencies for that application service. The dependencies can also include local dependencies for each application. Local dependencies can indicate network, hardware, and/or software resources needed to start execution of each application in the application service. For example, a computing device may be configured to execute function application 206A.

Local dependencies associated with function application 206A can indicate a certain amount of memory required for execution on a computing device, a certain percentage of processing bandwidth (i.e., of processors on the computing device), and/or a certain network bandwidth for connection to a computing device (i.e., that hosts associated database application(s)). Thus, in some embodiments, the local dependencies for this function application 206A can be evaluated based on the data dependencies. For example, the control module can evaluate local dependencies of network bandwidth between computing device(s) that execute applications with data dependencies with function application 206A. Dependencies of other applications can be determined in a similar manner.

This method can be applied to other commands for each application service. For example, control module 110 can also predict whether an application service that is already executing, can be stopped. However, in order to stop this application service, execution of each application can be stopped only if there are no other applications that are dependent on function application 206A. For example, control module 110 can, upon receiving the indication of this stop operation, determine whether there are any applications that are dependent on each application of this application service. Control module 110 can also predict outcome of other operations that can be performed on application services, such as pausing operation of an application service or one or more applications of such application service.

Figure 3:
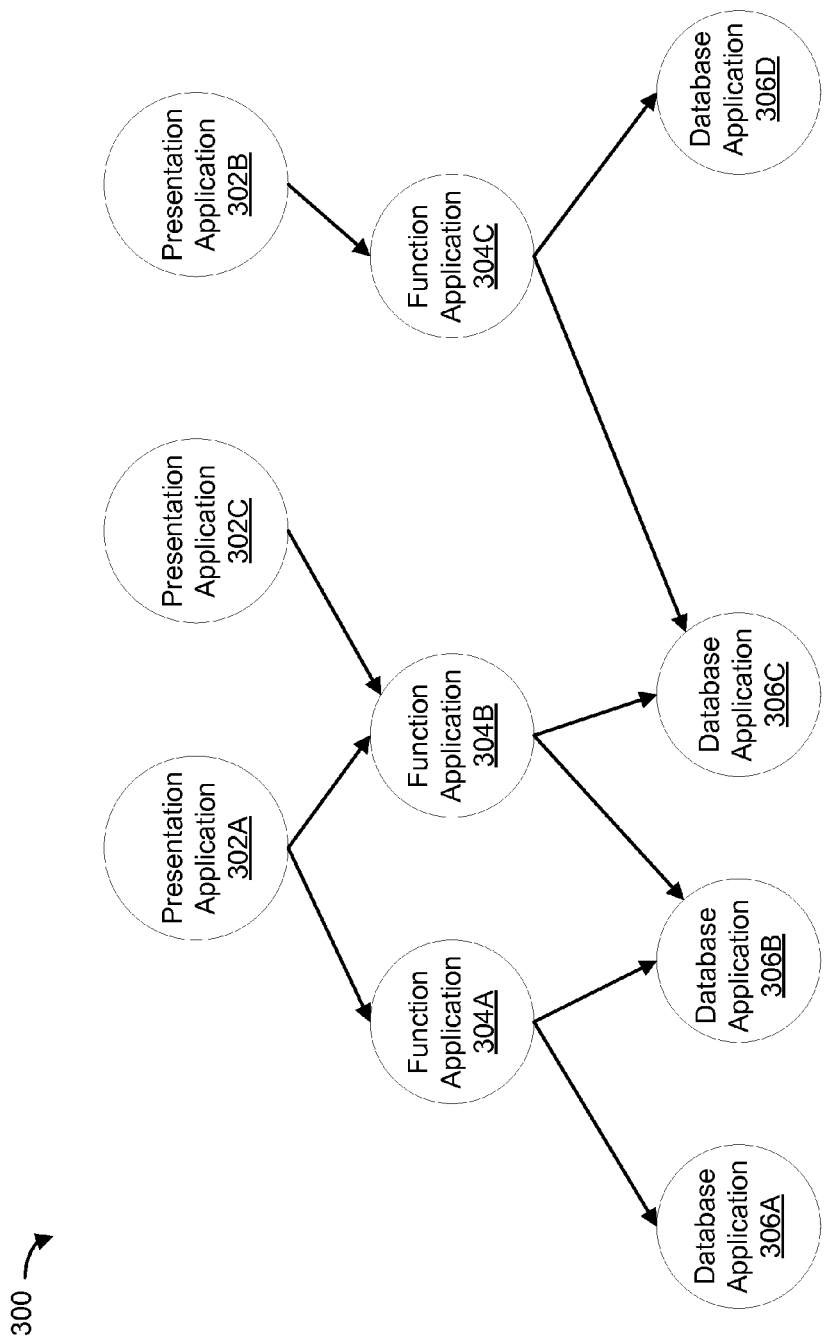
FIG. 3 is a block diagram of dependency graph showing dependencies of various multi-tier applications, according to one embodiment.

FIG. 3 is a block diagram 300 of a dependency graph showing dependencies of various applications, according to one embodiment. FIG. 3 shows dependencies between presentation applications 302A-302C, function applications 304A-304C, and database applications 306A-306D. Data dependency information can include such dependency graph. It is noted that although FIG. 3 illustrates a dependency graph, the manner in which the dependency information is stored may vary, and can use any one of a number of implementations.

As shown, presentation application 302A is dependent on function applications 304A and 304B. Presentation application 302B is dependent on function application 304C. Presentation application 302C is dependent on function application 304B. Function application 304A is dependent on database applications 306A and 306B. Function application 304B is dependent on database applications 306B and 306C. Function application 304C is dependent on database applications 306C and 306D. In one embodiment, database applications 306A-306D are not dependent on any other applications.

FIG. 3 can illustrate numerous possible application services. For example, a first application service can include presentation application 302A, function applications 304A and 304B, and database applications 306A-306C. A second application service can include presentation application 302B, function application 304C, and database applications 306C and 306D. A third application service can include presentation application 302C, function application 304B, and database applications 306B and 306C. However, in some embodiments, an application may be data dependent on different lower-tier applications, such as based on the application service. For example, one application service can include presentation application 302B, function application 304C, and database applications 306C (but not 306B), and another application service can include presentation application 302C, function application 304B, and database application 306B (but not 306C).

Figure 4:
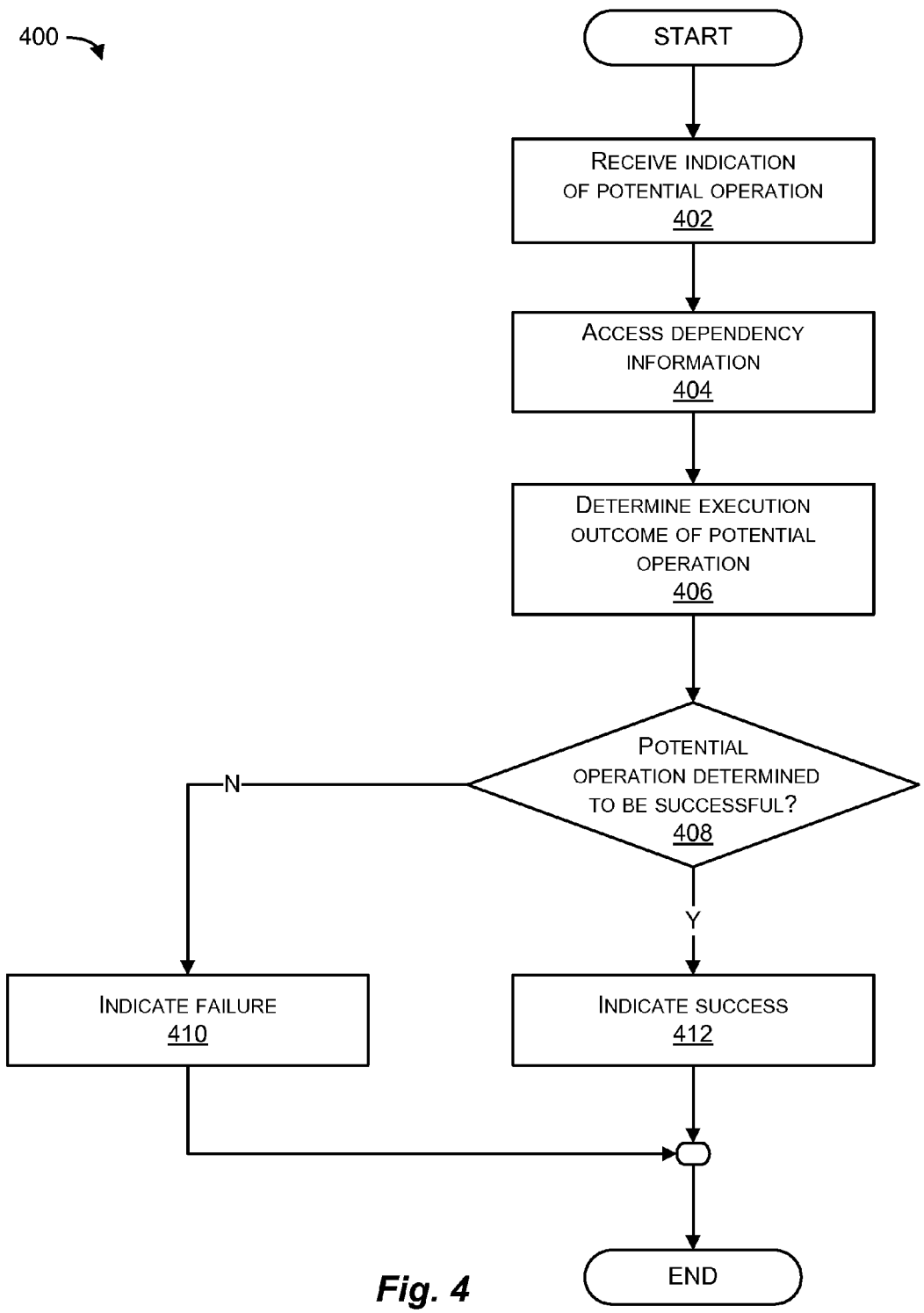
FIG. 4 is a flowchart illustrating a method for determining outcome of an operation performed on application(s), according to one embodiment.

FIG. 4 is a flowchart illustrating a method 400 for determining outcome of a potential operation, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIGS. 1-3. In one embodiment, method 400 can be executed on computing device 102(1)-102(N), such as by one or more of control modules 110(1)-110(P).

In element 402, control module(s) (e.g., control module 110(1)) receives indication of a potential operation, according to one embodiment. This indication can indicate start of an application service (that has not yet been started), stop of an application service (that is already executing), or another operation. The application service can already be executing, i.e., if the operation indicates a stop operation. In one embodiment, the control module can receive a command, such as a predict operation outcome command, that includes such indication.

In element 404, the control module access dependency information for applications of the application service, according to one embodiment. This dependency information can include data dependencies, such as shown by FIG. 3. For example, if the operation indication indicates a start operation, the control module can access data dependency information for application service that has not yet been started. If the operation indication indicates a stop operation, the control module can access data dependency information for application service that is already executing. The control module can also access data dependency information for other application services and/or applications that would be affected by the operation. It is noted that this data dependency information can indicate applications associated with each application of the application service. For example, if the data dependency indicates that function application 304B should be stopped (i.e., as a part of an application service), then both presentation application 302A (that is dependent on data from function application 304B) and database applications 306B-306C (that function application 304B is dependent on) are accessed as part of the data dependency.

In element 406, the control module determines execution outcome of the potential operation, according to one embodiment. This determination can be based on the data dependencies, as well as on local dependencies of applications included by a certain application service. For example, if the indication indicates a start operation, the control module can determine whether the indicated application service can be started. The control module can determine, based on the local dependencies, whether applications in the indicated application service can be started, e.g., whether there are enough resources to start and execute each application.

As described above with reference to FIG. 3, certain applications can be shared by multiple applications, some of which can be already started. However, some of these applications may not be able to support another application service, i.e., such as when function application 304B may not be able to communicate with additional presentation application(s) and/or database application(s). This limitation can be based, for example, on shortage of certain local dependencies of a computing device that is executing function application 304B. This determination is performed without executing the operation.

Similarly, if the indication indicates a start operation, the control module can determine whether the indicated application service can be stopped. Certain application services may not be stopped (at least without performing some corrective actions first), such as when there are other application services that use a certain application. For example, an application service that uses database application 306C may not be stopped, as there is another application service that has data dependencies on database application 306C. One embodiment of element 406 is described below with reference to FIG. 5.

In element 408, the control module determines whether potential execution of the operation was determined to be successful or unsuccessful, according to one embodiment. The control module can make this determination based on the outcome determined in element 406. If the outcome was determined to be unsuccessful, element 410 is performed next. If the outcome was determined to be successful, element 412 is performed next. In element 410, the control module can indicate, such as to another module (and/or the entity that send the operation indication of element 402) that this operation would be unsuccessful. In element 412, the control module can indicate, such as to another module (and/or the entity that send the operation indication of element 402) that this operation would be successful.

Figure 5:
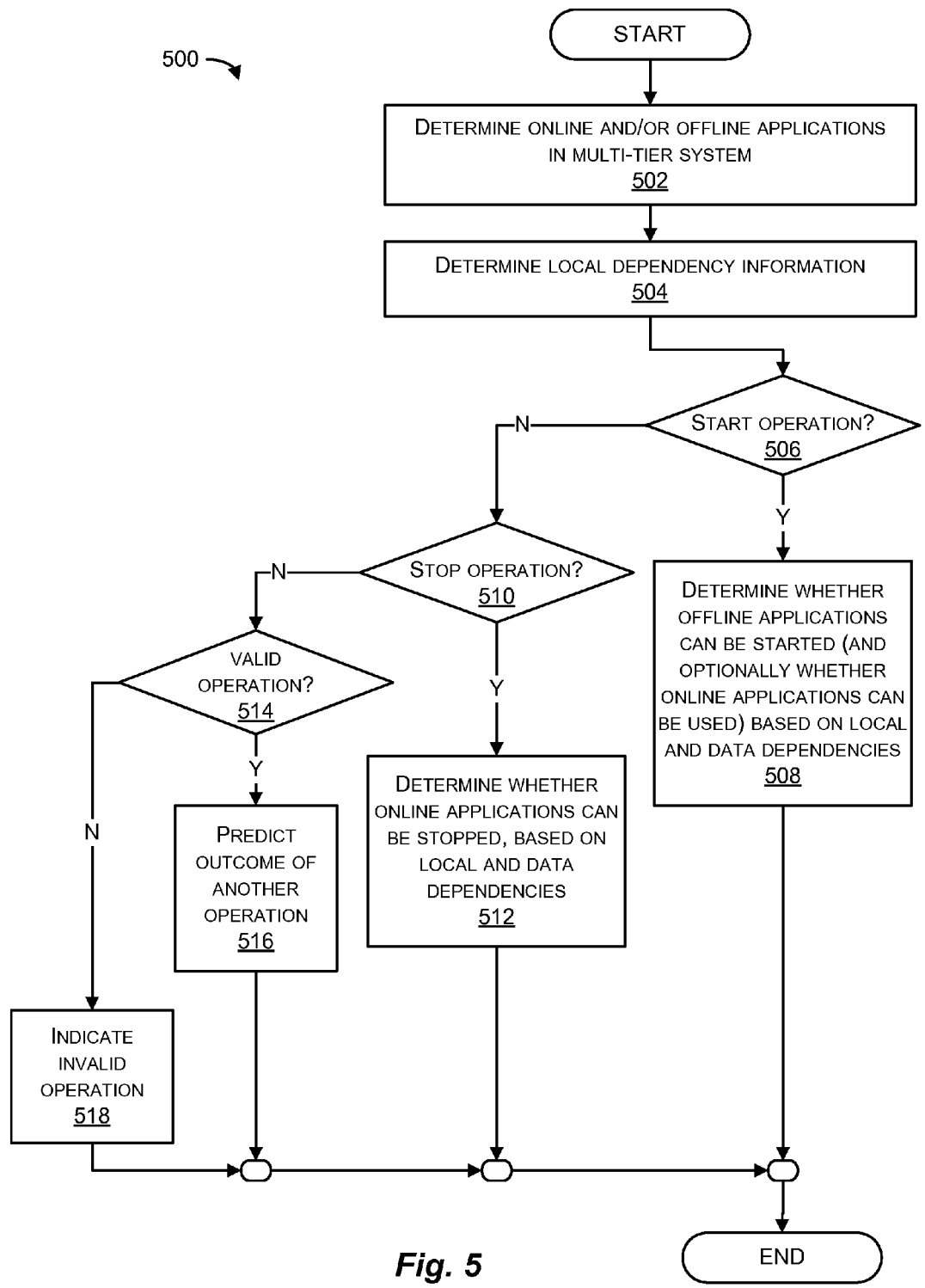
FIG. 5 is a flowchart illustrating a method for determining outcome of an operation performed on application(s) based on various dependencies, according to one embodiment.

FIG. 5 is a flowchart illustrating a method 400 for determining outcome of a potential operation based on various dependencies, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1-4. In one embodiment, method 500 can be executed on computing device 102(1)-102(N), such as by one or more of control modules 110(1)-110(P). In one embodiment, method 500 implements element 406, and optionally element 404, of method 400.

In element 502, control module(s) (e.g., control module 110(1)) determine online and/or offline applications in a multi-tier system, according to one embodiment. With reference to FIG. 2, various applications of multi-tier system (as shown by element 202) can be online or off-line. An online application can be already executing, such as a part of a certain application service. An off-line application is not yet executing (e.g., it can be paused, or it can be not yet have been started). An off-line application can also imply an application that is not yet set-up (e.g., initialized) to be executed. In one embodiment, the control module can determine such online and off-line applications for applications that are part of the application service indicated by the operation. In one embodiment, the control module can determine such online and off-line applications for all related applications to this application service, such as applications with data dependencies on applications associated with this application service.

In element 504, the control module(s) determines local dependencies for applications related to the application service, according to one embodiment. Each online application can use various local resources, such as memory, processing bandwidth, etc). For example, the control module can determine the local dependencies that are being used by each application of a certain application service that is already executing, such as applications represented by elements 302A, 304A, 306A, and 306B of the dependency tree of FIG. 3. Similarly, each offline application would need to be able to use additional local resources before starting execution. The control module can also determine the local dependencies that are needed by each application of a certain application service that has not yet been started, such as applications represented by elements 302B, 304C, 306C, and 306D of the dependency tree of FIG. 3. In this example, database application 306C has already been started.

In one embodiment, the control module can communicate with each tier and/or application that is indicated by the data dependency. For example, based on the data dependencies, the control module can access applications 302B, 304C, 306C, and 306D (that may be offline) to determine their respective local dependencies. The control module can also communicate with the computing devices that can implement each such application, e.g., if such applications are not yet instantiated.

In element 506, the control module determines whether the operation is a start operation, according to one embodiment. It is noted that although FIG. 5 shows elements 506, 510, and 514 being distinct elements, in one embodiment these elements can be performed in one step, such as similar to that using a case statement. If the operation is a start operation, element 508 is performed next. If the operation is not a start operation, element 510 is performed next.

In element 508, the control module can determine whether offline applications can be started, according to one embodiment. Optionally, the control module can also determine whether any online applications can be used by the application service indicated by the start operation. For example, with reference to FIG. 3, a first application service (that includes applications 302A, 304A, 304B, 306A, 306B, and 306C) can be already executing. In this example, the operation being analyzed is a start of another application service that would include applications 302B, 304C, 306C, and 306D.

The control module can determine whether applications 302B, 304C, and 306D can be started. This determination with regard to applications 302B, 304C, and 306D can be based on local dependencies, such as whether computing devices that would implement each of applications 302B, 304C, and 306D are operational and accessible, whether these computing devices have enough bandwidth to communicate with each other, whether computing device(s) that implement the database application 306D have enough storage space to store any anticipated data received from application 304C, or even whether a network connection between computing devices that implement applications 304C and 304D is reliable and/or fast enough to support this additional application service.

The control module can also determine whether application 306C, which is already executing, can support another function application (application 304C). This determination with regard to application 306C can be based on local dependencies and on the data dependencies. The data dependencies can indicate that the first application service includes database application 306C that is planned to be used by the second application service. The local dependencies can be used to determine whether a computing device that implements application 306C has enough bandwidth/processing power to communicate with a computing device that implements application 304C (e.g., without sacrificing some predetermined amount of responsiveness with respect to the first application service), whether computing device that implements application 306C has enough additional storage space to store any anticipated data received from application 304C, or even whether a network connection between computing devices that implement applications 304C and 304D is reliable and/or fast enough to support this additional application service.

In element 510, the control module determines whether the operation is a stop operation, according to one embodiment. If the operation is a stop operation, element 512 is performed next. If the operation is not a stop operation, element 514 is performed next.

In element 512, the control module can determine whether online applications can be stopped, according to one embodiment. For example, with reference to FIG. 3, the first application service (that includes applications 302A, 304A, 304B, 306A, 306B, and 306C) and the second application service (that includes applications 302B, 304C, 306C, and 306D) can be already executing. The operation can indicate that the first application service is to be stopped. Based on the data dependencies, the control module can determine that application 306C is shared by the first and the second application services. In this example, since application 306C is shared, then the predicted outcome would indicate that the first application service cannot be stopped. However, the control module (and/or another module) can perform corrective actions, such as to de-couple the shared application from the application service being stopped. However, if there are no applications being shared, then the predicted outcome would indicate that the service application can be stopped.

In element 514, the control module determines whether the operation is a valid operation, according to one embodiment. If the operation is a valid operation, element 516 is performed next. If the operation is not a valid operation, element 514 is performed next.

In element 516, the control module can determine whether some other operation (such as a pause operation) can be performed on the online/offline applications, according to one embodiment. For a pause operation, similar analysis as that for a stop operation (e.g., element 512) can be performed. For other operations, other analysis can be performed that based on the data dependencies and local dependencies. In element 518, the control module can indicate an invalid operation, according to one embodiment.

Thus, the control module receives an operation indication, and then access dependency information (e.g., data dependency) to determine any applications that are would be affected by such operation. Based on the data dependency, the control module can then determine the local dependencies for each of these applications. The control module then determines whether operation can be successfully performed. For example, for a stop (of an application service) operation, the control module determines whether applications in the indicated application service can be stopped without adversely affecting other application services. For a start (of an application service) operation, the control module determines whether applications in the indicated application service can be started, such as whether there are enough resources (as indicated by the local dependencies) to do so.

Thus, the control module can communicate with each of the tiers and check if those applications can be placed online or offline. If some applications cannot be placed online or offline, the control module can determine why. There are multiple factors which can impact the success of an operation within a tier. For example, at a cluster/physical level, such factors include state of the tier, any pending communications, any local conflicting dependencies etc. At an application service level, such factors can include state/availability of dependent applications/tiers etc. As a result of this analysis, the control module can indicate that this operation, that would attempt to stop a certain database tier that is shared by multiple function (and even web applications), should not be performed, unless some corrective action is taken first. An example corrective action can include decoupling affected applications from the application service.

Figure 6:
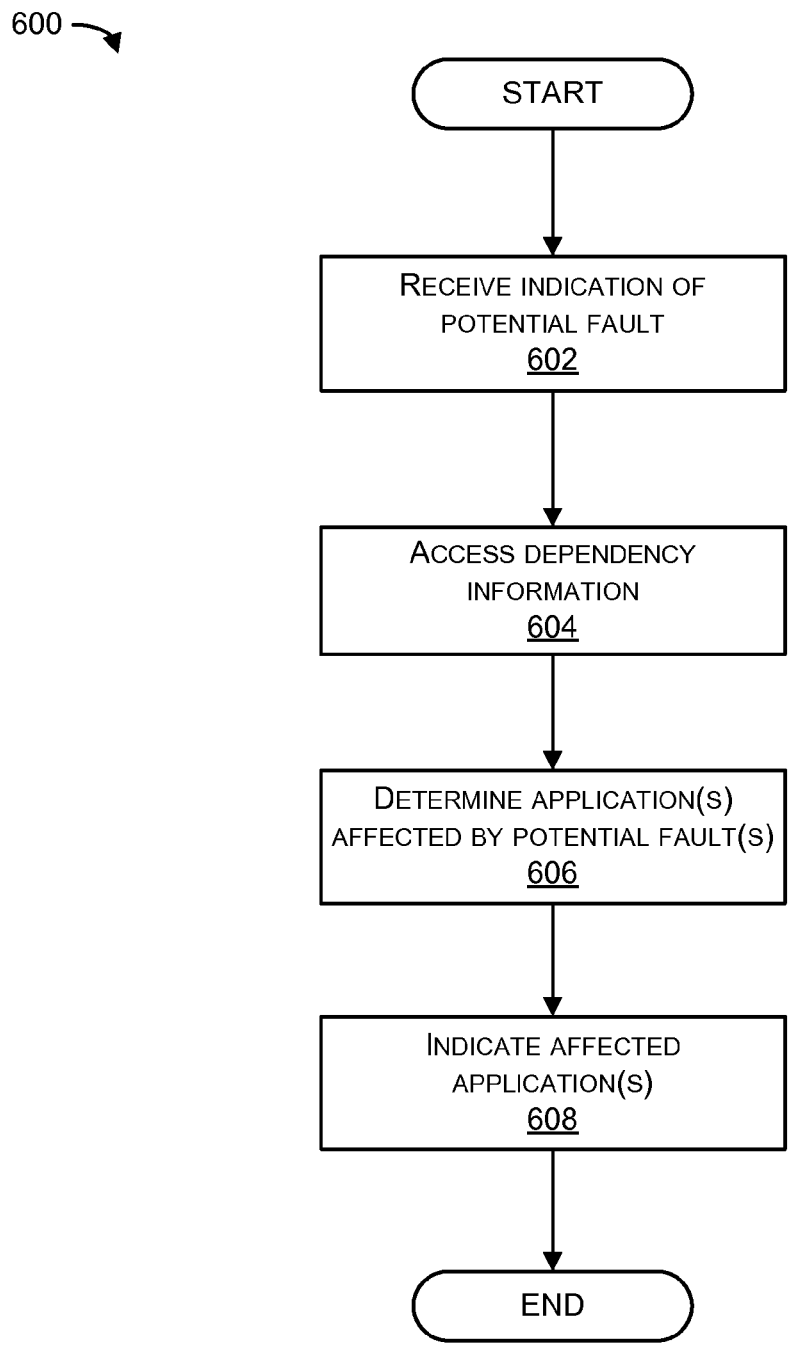
FIG. 6 is a flowchart illustrating a method for determining outcome of a potential fault, according to one embodiment.

FIG. 6 is a flowchart illustrating a method 600 for determining outcome of a potential fault, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600 is described with reference to variations of the elements described in connection with FIGS. 1-3. In one embodiment, method 600 can be executed on computing device 102(1)-102(N), such as by one or more of control modules 110(1)-110(P).

In element 602, the control module(s) receives indication of a potential fault, according to one embodiment. This potential fault can occur at a certain application tier, a group of applications, or a single application. For example, with reference to FIG. 2, the indication can indicate that the fault can happen to the whole function application tier 206, a few function applications, such as applications 206A-206B, or a single application, such as application 206C. The fault can be a logical fault that indicates groups of applications and/or an application tier that would be at fault (e.g., would be taken offline/stopped all execution, etc.). The fault can also be a physical fault that indicates one or more computing devices that would be at fault (e.g., would be taken offline/stopped all execution, etc.).

In element 604, the control module accesses dependency information for applications that are affected by the potential fault, according to one embodiment. This dependency information includes data dependencies, such as shown in FIG. 3. In one embodiment, this dependency information can also include local dependencies.

In element 606, the control module determines applications that are affected by the potential fault, according to one embodiment. As described above, this fault can be a logical or a physical fault. For a logical fault, the control module can determine the application(s) as indicated by the fault indication. For example, if the indication indicates a logical fault to the function tier 206, then the control module can determine that this would (directly) affect applications 206A-206E. For a physical fault, the control module can determine the application(s) that are indicated by the fault indication. For example, if the indication indicates a physical fault to a computing device that implements function applications 206A-206B, then the control module can determine (e.g., based on local dependencies) that function applications 206A-206B would be (directly) affected.

Furthermore, based on data dependencies, control module can determine additional applications that are associated with the directly affected applications described above. These additional applications include applications that have data dependencies with the directly affected applications. For example, with reference to FIG. 3, if the fault (logical or physical) indicates that applications 304A and 304B are affected, then the control module can determine that, based on the data dependencies, applications 302A and 302C, as well as applications 306A-306C, would be affected by this fault. The control module can also determine that two application services would be affected by this fault, i.e., the application service that includes applications 302A, 304A, 304B, 306A, and 306B, and another application service that includes applications 302C, 304B, 306B, and 306C.

In element 608, the control module can indicate, such as to another module (and/or the entity that send the indication of the potential indication of element 402) potential applications that would be affected by this fault. It is noted that while the above description discusses performing the analysis based on one fault indication, this method can be easily used to perform (e.g., in parallel) this analysis for multiple faults.

Thus, the control module receives a fault indication, and then access dependency information (e.g., data dependency) to determine any applications that are would be affected by such fault. The control module can then determine applications (and/or application services) that would be affected by such fault. As a result, impact of a fault on any of the tiers can then be analyzed, such as by system administrator. This analysis can be used for recovery of applications or for designing redundant elements of the distributed storage system. For example, the control module can use this fault analysis to initiate a redundant function application 304B that can take over processing in case of this fault.

Figure 7:
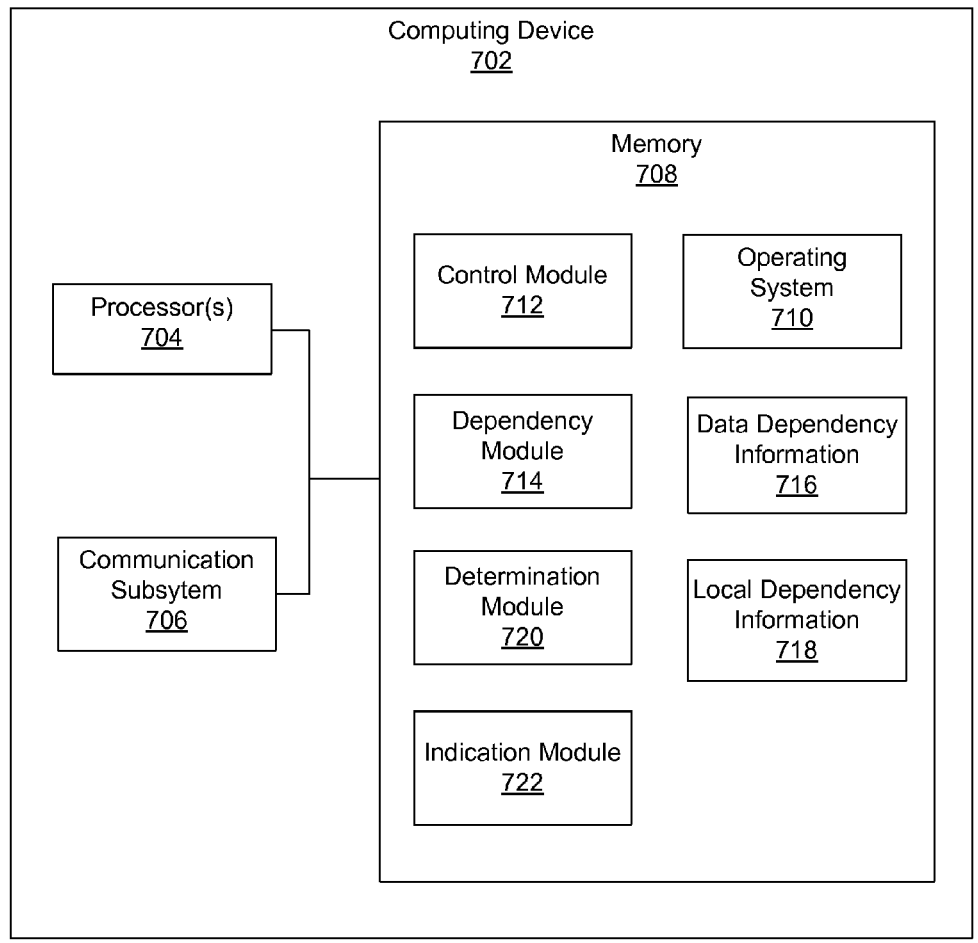
FIG. 7 is a block diagram illustrating various components of a computing device, according to some embodiments.

FIG. 7 is a block diagram 700 of a computing device 702, such computing devices 102(1)-102(2), according to some embodiments. Computing device 702 includes a processor 704, communication subsystem 706, and a memory 708. Memory 708 includes an operating system 710, a control module 712, a dependency module 714, data dependency information 716, local dependency information 718, a determination module 720, and an indication module 722. Control module 712 can implement control modules 110(1)-110(0). Dependency module 714 can access data dependency information 716 and/or local dependency information 718. Indication module 722 can receive operation and/or fault indications, such as from clients and/or other computing devices. Determination module 720 can determine outcome of potential operations and/or potential faults.

It is noted that is some embodiments, one or more of these elements may be combined. For example, control module 712 can implement dependency module 714, determination module 720, and/or indication module 722. It is noted that is some embodiments, one or more of these elements may be distributed across multiple computing devices. For example, portions of data dependency information 716 and/or local dependency information for each application can be stored by computing devices that implement respective applications. It is also noted that one or more of modules 710-722 may be implemented as a software and/or hardware module. It is also noted that in some embodiments one or more of elements of computing device 702 may not be used. Processor(s) 704 can execute one or more of modules 710-722. One or more of modules 710-722 can implement at least portions of methods 400, 500, and/or 600.

Figure 8:
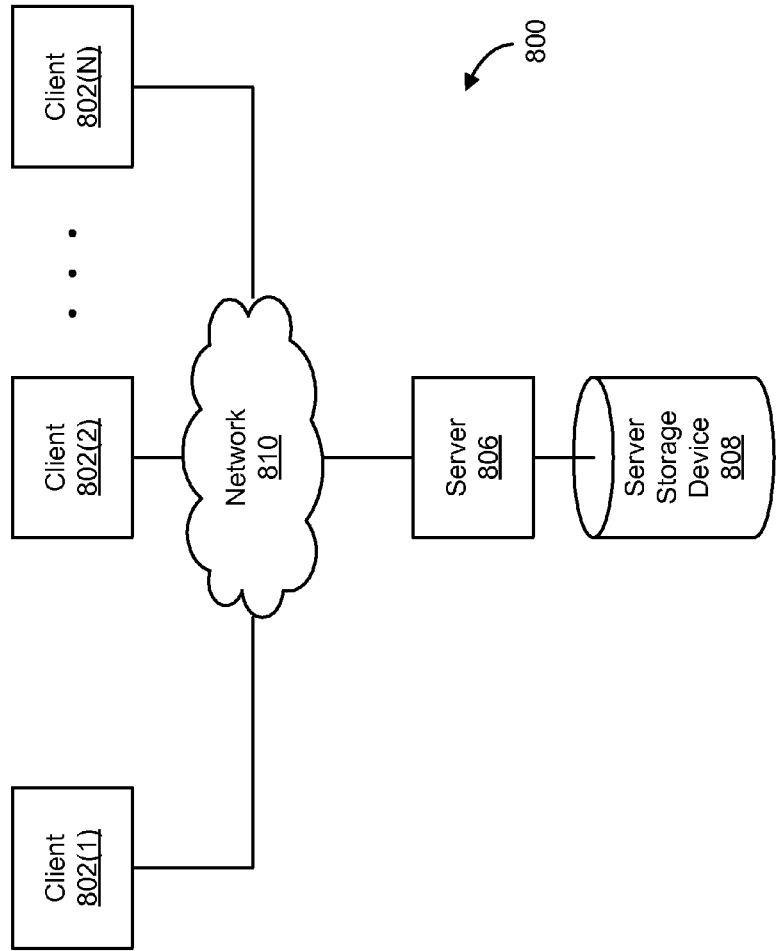
FIG. 8 is a block diagram illustrating a network architecture in which embodiments of the present application can be implemented.

Elements of network architecture can be implemented using different computer systems and networks. An example of one such network environment is described below with reference to FIG. 8. FIG. 8 is a simplified block diagram illustrating a network architecture 800 in which one or more clients are provided with access to a server via various network connections. As depicted in FIG. 8, clients 802(1)-(N) are coupled to a network 810, and so are able to access a server 806 (which can be used to implement computing device(s) of FIG. 1) via network 810. Other servers (not shown) can be used instead to implement computing devices, server(s), and/or node(s). A client can be implemented using, for example, a desktop computer, a laptop computer, a workstation, a server, a cell phone, a smart phone, a network-enabled personal digital assistant (PDA), or the like. An example of network 810, which can be used by clients 802(1)-(N) to access server 806, is the Internet. Alternatively, access to server 806 can be provided by a local area network (LAN) utilizing Ethernet, IEEE 802.11x, or some other communications protocol. As will be appreciated, server 806 can be accessed by clients coupled directly thereto (not shown).

As also depicted on FIG. 8, server 806 is coupled to a server storage device 808, which includes a data volume such as storage device(s) 104(1)-104(N), among others. Server storage device 808 can be implemented as a single storage device or a collection of storage devices. Server storage device 808 can also be implemented as a storage area network, which couples remote storage devices to a server (e.g., server 806), such that the remote storage devices appear as locally-attached storage devices to the server's OS, for example.

In light of the present disclosure, those of skill in the art will appreciate that server storage device 808 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 800 can include other components such as routers, firewalls and the like that are not germane to the discussion of the present network and will not be discussed further herein. Those of skill in the art will also appreciate that other configurations are possible. For example, clients 802(1)-(N) can be directly coupled to server storage device 808 without the user of a server or Internet; server 806 can be used to implement both the clients and the server; network architecture 800 can be implemented without the use of clients 802(1)-(N); and so on. As an example implementation of network architecture 800, server 806, services requests to data generated by clients 802(1)-(N) to data stored in server storage device 808.

Figure 9:
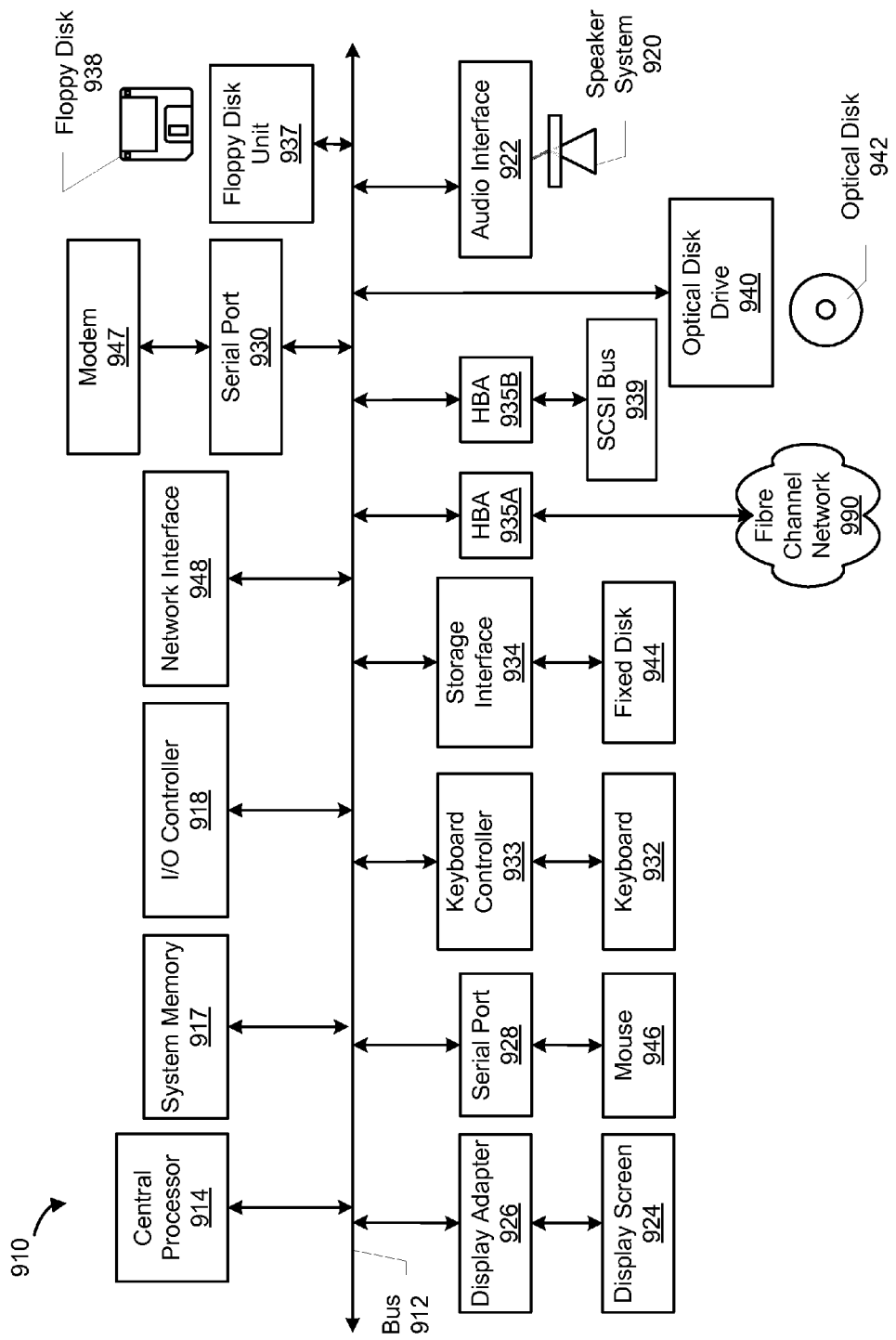
FIG. 9 is a block diagram that illustrates an example of a computer system suitable for implementing embodiments of the present application.

FIG. 9 depicts a block diagram of a computer system 902 suitable for implementing the present disclosure. Computer system 902 may be illustrative of various computer systems in the networked system of FIG. 1, such as computer device(s), among others. Computer system 902 includes a bus 912 which interconnects major subsystems of computer system 902, such as a central processor 904, a system memory 910 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 910, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 902 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 902, can connect to a standard computer readable medium for storage and/or retrieval of information, such as a fixed disk drive 944. Fixed disk drive 944 may be a part of computer system 902 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code for predicting outcome of various operations and/or faults for multi-tier applications (such as described above with reference to the methods of FIGS. 4-6), etc., to implement the present disclosure can be stored in computer-readable storage media such as one or more of system memory 910, fixed disk 944, optical disk 942, or floppy disk 938. Memory 920 is also used for storing temporary variables or other intermediate information during the execution of instructions by the processor 904. The operating system provided on computer system 902 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving an operation indication, wherein
      the operation indication indicates an operation that is to be performed using a multi-tier application system,
      the multi-tier application system comprises a plurality of applications,
      the plurality of applications comprise a first application and a second application, and
      the first application and the second application are implemented using different tiers of the multi-tier application system;
   accessing dependency information, wherein
      the dependency information indicates first data dependencies between the first application and the second application; and
   determining an outcome of execution of the operation, wherein
      the determining is based on at least on the dependency information, and
      the determining does not comprise executing the operation.

2. The method of claim 1, wherein
   the determining the outcome of the execution comprises determining whether the execution of the operation will be successful, and
   the operation is configured to be executed based on the outcome.

3. The method of claim 2, further comprising:
   in response to a determination that the operation will be successful, indicating operation success in the outcome.

4. The method of claim 1, wherein
   the dependency information comprises one or more dependency trees that indicate the first data dependencies.

5. The method of claim 1, wherein
   the determining the outcome of execution of the operation comprises
      determining whether the execution of the operation affects a third application.

6. The method of claim 1, further comprising:
   determining additional applications of the plurality of applications, wherein
      the additional applications comprise applications affected by the execution of the operation.

7. The method of claim 1, further comprising:
determining local dependencies of the first application and the second application, wherein
the local dependencies include one or more of characteristics of one or more computing systems that are configured to execute the first and the second application, and
the determining the outcome is further based on the local dependencies.

8. The method of claim 1, wherein
the determining the outcome of the execution of the operation further comprises
querying at least one of the first or the second application for any dependencies.

9. The method of claim 1, wherein
the operation comprises:
starting at least a portion of the multi-tier application system,
stopping at least the portion of the multi-tier application system, or
pausing at least the portion of the multi-tier application system.

10. A system comprising:
one or more processors;
data dependency information, wherein
the data dependency information indicates first data dependencies between a first application and a second application of a plurality of applications,
a multi-tier application comprises the plurality of applications,
the first application and the second application are implemented using different tiers of the multi-tier application system;
a control module, configured to be executed using the one or more processors, wherein
the control module is configured to
receive an operation indication, wherein
the operation indication indicates an operation that is to be performed using the multi-tier application system,
access the data dependency information, wherein
the data dependency information indicates first data dependencies between the first application and the second application, and
determine an outcome of execution of the operation, wherein
the determining is based on at least on the data dependency information, and
the determining does not comprise executing the operation.

11. The system of claim 10, wherein
the control module is further configured to determine whether the execution of the operation will be successful, and
the operation is configured to be executed based on the outcome.

12. The system of claim 10, wherein
the control module is further configured to determine additional applications of the plurality of applications, and
the additional applications comprise applications affected by the execution of the operation.

13. The system of claim 10, wherein
the control module is further configured to determine local dependencies of the first application and the second application,
the local dependencies include one or more of characteristics of one or more computing systems that are configured to execute the first and the second application, and
the control module is configured to determine the outcome based on the local dependencies.

14. A computer program product comprising:
a plurality of instructions, comprising
a first set of instructions, executable on a computer system, configured to receive an operation indication, wherein
the operation indication indicates an operation that is to be performed using a multi-tier application system,
the multi-tier application system comprises a plurality of applications,
the plurality of applications comprise a first application and a second application, and
the first application and the second application are implemented using different tiers of the multi-tier application system,
a second set of instructions, executable on the computer system, configured to access dependency information, wherein
the dependency information indicates first data dependencies between the first application and the second application, and
a third set of instructions, executable on the computer system, configured to determine an outcome of execution of the operation, wherein
the determining is based on at least on the dependency information, and
the determining does not comprise executing the operation; and
a non-transitory computer-readable storage medium, wherein the instructions are encoded in the non-transitory computer-readable storage medium.

15. The computer program product of claim 14, wherein the instructions further comprise:
a fourth set of instructions, executable on the computer system, configured to determine whether the execution of the operation will be successful, wherein
the operation is configured to be executed based on the outcome.

16. The computer program product of claim 14, wherein the instructions further comprise:
a fourth set of instructions, executable on the computer system, configured to determine additional applications of the plurality of applications, wherein
the additional applications comprise applications affected by the execution of the operation.

17. The computer program product of claim 14, wherein the instructions further comprise:
a fourth set of instructions, executable on the computer system, configured to determine local dependencies of the first application and the second application, wherein
the local dependencies include one or more of characteristics of one or more computing systems that are configured to execute the first and the second application, and
the determining the outcome is further based on the local dependencies.

* * * * *

UNITED STATES PATENT AND TRADEMARK OFFICE
CERTIFICATE OF CORRECTION

| | |
|---|---|
| PATENT NO. | : 8,990,817 B1 |
| APPLICATION NO. | : 13/605277 |
| DATED | : March 24, 2015 |
| INVENTOR(S) | : Debasish Garai and Sumet S. Kembhavi |

It is certified that error appears in the above-identified patent and that said Letters Patent is hereby corrected as shown below:

Claims
Column 15
Line 29, in Claim 10, replace: "application comprises" by -- application system comprises --

Signed and Sealed this
Seventeenth Day of May, 2016

Michelle K. Lee
*Director of the United States Patent and Trademark Office*